(12) United States Patent
Chiu et al.

(10) Patent No.: US 6,973,033 B1
(45) Date of Patent: Dec. 6, 2005

(54) METHOD AND APPARATUS FOR PROVISIONING AND MONITORING INTERNET PROTOCOL QUALITY OF SERVICE

(75) Inventors: Angela L. Chiu, Holmdel, NJ (US); Seyhan Civanlar, Middletown Township, Monmouth County, NJ (US); Albert Gordon Greenberg, Millburn, NJ (US); Zhuangbo Tang, Tinton Falls, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/806,742

(22) Filed: Mar. 23, 2004

Related U.S. Application Data

(63) Continuation of application No. 09/475,512, filed on Dec. 30, 1999, now Pat. No. 6,744,767.

(51) Int. Cl.[7] .............................................. H04J 3/16
(52) U.S. Cl. .............. 370/230.1; 370/235; 370/395.21; 709/223; 709/229
(58) Field of Search ................................ 370/230–238, 370/252–254, 401–402, 412–413, 466–468, 370/474, 395.2–395.43; 709/223, 229

(56) References Cited

U.S. PATENT DOCUMENTS

| | | | | |
|---|---|---|---|---|
| 5,995,486 A | * | 11/1999 | Iliadis | 370/229 |
| 6,259,699 B1 | * | 7/2001 | Opalka et al. | 370/398 |
| 6,483,839 B1 | * | 11/2002 | Gemar et al. | 370/395.42 |
| 6,553,568 B1 | * | 4/2003 | Fijolek et al. | 725/111 |
| 6,591,299 B2 | * | 7/2003 | Riddle et al. | 709/224 |
| 6,594,268 B1 | * | 7/2003 | Aukia et al. | 370/400 |
| 6,636,482 B2 | * | 10/2003 | Cloonan et al. | 370/230 |
| 6,658,479 B1 | * | 12/2003 | Zaumen et al. | 709/238 |
| 6,697,335 B1 | * | 2/2004 | Ergun et al. | 370/238 |
| 6,717,912 B1 | * | 4/2004 | Lemyre et al. | 370/230 |
| 6,721,270 B1 | * | 4/2004 | Mitra et al. | 370/230 |
| 6,760,334 B1 | * | 7/2004 | Nakil et al. | 370/395.2 |
| 2002/0055998 A1 | * | 5/2002 | Riddle et al. | 709/224 |

* cited by examiner

*Primary Examiner*—Zarni Maung
*Assistant Examiner*—Van Kim T. Nguyen

(57) ABSTRACT

An architecture, design, and realization for providing Quality of Service (QoS) to Internet Protocol (IP) networks based on a three-class differentiated service scheme where the service provider uses a resource management system and a schedule optimizer to enable the optimal use of bandwidth and buffer resources at each node or router along the various links between the ingress and egress points in a network. The resource reservation system checks to determine if sufficient bandwidth resources are available along the path requested by the customer for a particular class. The schedule optimizer ensures that sufficient buffer resource allocations and parameter settings are made to optimally reach the predetermined QoS criteria for each of the three classes. The system also contains a mechanism supporting resource reservations providing additional resources along alternative paths if the selected path links fail in the network.

1 Claim, 9 Drawing Sheets

METHOD AND APPARATUS FOR PROVISIONING AND MONITORING INTERNET PROTOCOL QUALITY OF SERVICE

CROSS-REFERENCE TO RELATED APPLICATIONS

This is a continuation of U.S. patent application Ser. No. 09/475,512 filed Dec. 30, 1999, now U.S. Pat. No. 6,744,767.

FIELD OF THE INVENTION

This invention relates to a method and apparatus for allocating bandwidth during implementation of Quality of Service (QoS) using Internet Protocol (IP) provisioning. Specifically, the invention allocates bandwidth resources between service classes and during network congestion either buffers or randomly drops packets of lower quality of services to ensure delivery with minimized packet loss for higher quality of services.

BACKGROUND

Quality of Service (QoS) mechanisms for packet transmission typically utilize data path mechanisms (packet classification, policing, shaping, buffering, and scheduling) and control path mechanisms (signaling, resource reservation, routing) for ensuring packet delivery during periods of network congestion. Currently within the networking community there exist two schools of thought regarding QoS, represented by two working groups of the Internet Engineering Task Force (IETF). The first school of thought, Integrated Services (int-serv), supports fine-grained data path and control path QoS mechanisms, while the second school of thought, Differentiated Services (diff-serv), supports coarse-grained mechanisms that apply to a small set of aggregate flow classes. Int-serv mechanisms may provide the appropriate solution in the longer term; however, the QoS mechanisms now available from most mature router vendors correspond more closely with the diff-serv mechanisms.

The main concepts of diff-serv are: (1) aggregates of flows (rather than individual flows) receive a service; (2) the forwarding engine is required to provide delay and loss guarantees in a statistical or relative (rather than absolute quantitative) sense; and (3) the forwarding treatment that should be received by a packet is identified by a byte in the packet header, rather than by a flow lookup. The flow aggregates in diff-serv can be specified in several ways. To illustrate, consider a corporation that has three sites. Each site communicates with all the other sites over the Internet. A site may also communicate with other entities connected to the global Internet. In such a case, the flow aggregates that should receive differentiated QoS can be specified by:
  1. Point-to-point flows—a set of packets originating from a first site and destined to a second site.
  2. Point-to-multi-point flows—a set of packets originating from a first site and destined to either a second or a third site.
  3. Point-to-any-point flows—any packet that originates from a first site and destined to any other site.

To signal resource reservation needs, the IETF has developed the Reserve Reservation (RSVP) hop-by-hop protocol. Although RSVP was initially intended for int-serv, it was later realized that RSVP provides adequate signaling support for aggregates of traffic flows, such as those found in diff-serv schemes. In the diff-serv schemes, hop-by-hop signaling is used only for admission control, not for creating per-flow state in intermediate routers, as is typically done in the int-serv scheme.

A need exists for an architecture and design supporting Quality of Service (QoS) features using Internet Protocol supporting (1) a guarantee of performance under certain conditions, (2) supporting differentiation of product services with Internet providers, and (3) attaining economies of scale with multiple services integrated on a common network. The QoS should maximize the probability of delivery of packets for the highest levels of service while minimizing the probability of dropped packets. However, this optimization should not erode the lowest levels of service such that packet delivery delays for lower classes of services are so long that the lower classes of services cease to deliver the level of subscribed service.

SUMMARY

This invention is a diff-serv resource reservation system that checks to determine if sufficient bandwidth resources are available along the data flow pathway requested by the customer for a particular class of service. The resource reservation system determines the parameters such that a data packet can be transmitted according to the desired Quality of Service (QoS) parameters for the desired class. A schedule optimizer ensures that sufficient buffer resource allocations and parameter settings in the routers and servers along the data path are made to optimally reach the predetermined QoS criteria for each of the desired classification of service levels. The system also contains a mechanism supporting resource reservation providing dynamic allocation of additional resources along alternative paths if the selected path links fail in the network.

For a three-service class QoS scheme comprising a Virtual Leased Line, Assured and Basic service classes, the resource management system optimizes packet traffic flow from (1) the values for the maximum QoS deterioration levels of the traffic caused by individual reservations for Virtual Leased Line traffic, (2) the maximum QoS deterioration levels of the Basic service caused by the Assured service, and (3) the packet loss ratios of the Assured versus the Basic services. These values provide information necessary for determining capacity planning and provide the minimum utilization of a link to be considered when congestion occurs. Average utilization of Virtual Leased Line traffic with respect to the peak rate subscribed along each link is computed versus the maximum percentage of the total Virtual Leased Line subscription with respect to the link capacity. Preconfiguration of all the routers with parameter settings for Weighted Fair Queuing (WFQ), buffer allocations, and Weighted Random Early Discard (WRED) further allows the resource reservation system to maintain the desired QoS in the network.

BRIEF DESCRIPTION OF THE DRAWINGS

The summary of the invention, as well as the following detailed description of preferred embodiments, is better understood when read in conjunction with the accompanying drawings, which are included by way of example, and not by way of limitation with regard to the claimed invention.

DETAILED DESCRIPTION OF PREFERRED EMBODIMENTS

Figure 1:
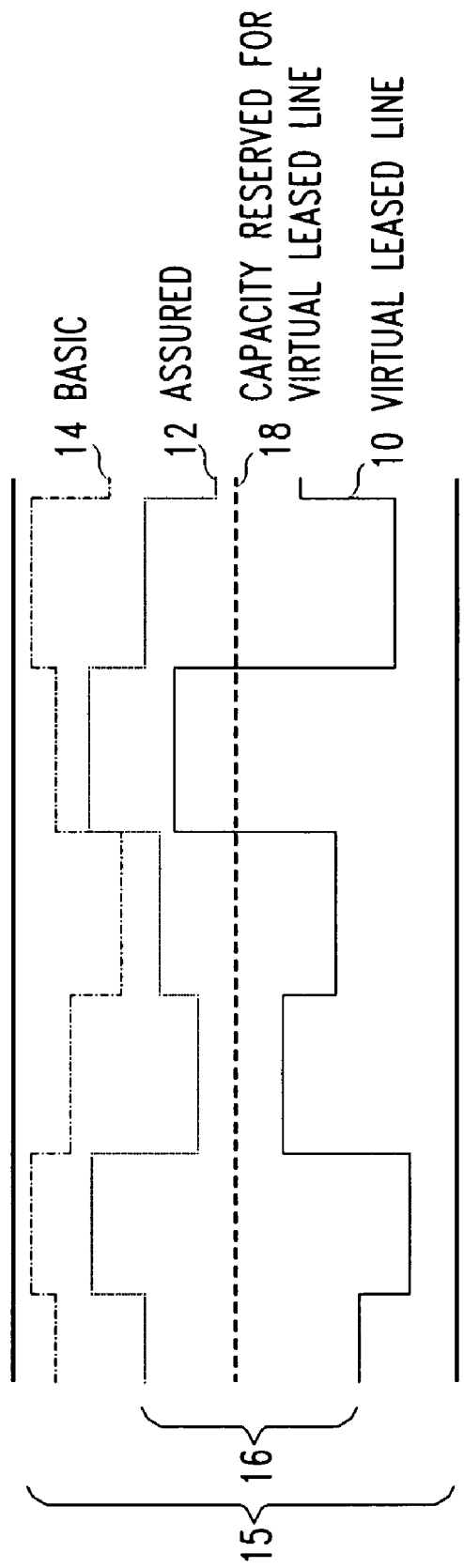
FIG. 1 illustrates the hierarchy of service classifications according to Virtual Leased Line, Assured and Basic service classes in a fixed bandwidth environment.

FIG. 1 illustrates the three classes of services: Virtual Leased Line (10), Assured (12) and Basic (14) services supported across a data line of fixed bandwidth (15) for Quality of Service (QoS) functionality. These three classes of services have different characteristics in order to satisfy the service demands of a user. At the highest level in the QoS hierarchy, Virtual Leased Line service (10) is designed for applications and customers that require predictable point-to-point performance. A Virtual Leased Line (10) is a point-to-point data line with a guaranteed peak transmission rate. Implementing performance restrictions and setting criteria on the line, packet loss due to network congestion, delay, and delay-jitter is minimized. Examples of applications employing Virtual Leased Line level of service (10) include Voice over Internet Protocol (VoIP), transaction processing, and multimedia applications that require low delay and jitter.

The second class of service in the hierarchy is Assured service (12) and is designed for customers who need "better than best-effort service." When congestion exists, packets that receive Assured service (12) gain a degree of priority over packets that receive Basic service (14) in terms of packet loss. Basic service (14), the lowest class of service, is designed for customers who require general Internet access where some delay is not critical to the success of the application. Basic service (14) is the equivalent of best-effort delivery service that is widely used in current Internet servicing.

A Virtual Leased Line (10) can be realized independently of Assured service, and vice versa. The three-class model can be extended with more classes to include additional enhanced classes that are similar to the Virtual Leased Line service (10) class but also provide for over-booking of packets and thus can be subscribed to by a customer at a less expensive rate. Typically, a Virtual Leased Line (10) transmitting packets is not over-booked. During intervals where Virtual Leased Line (10) data flows do not use their allotted bandwidth, the remaining bandwidth (16) is available to Assured (12) and Basic (14) traffic flows. That is, Assured (12) and Basic (14) traffic flows share the bandwidth not committed to Virtual Leased Line (10) traffic flows as well as any idle bandwidth committed to Virtual Leased Line (10) traffic flows.

Since Assured packets obtain higher priority handling than Basic packets during periods of congestion, Assured (12) traffic flows obtain a degree of protection against overloads of Basic (14) traffic. Assured (12) packets get priority over Basic (14) packets at each hop, but unlike the case for Virtual Leased Line (10) packets, the routers provide no guarantee that the delays at all hops along the flow path will be small. Instead, traffic measurement, provisioning systems plans and management of the network capacity allow Assured (12) traffic flows to experience small delays with sufficiently high probability. With appropriate traffic engineering and pricing, Assured (12) traffic consistently sees a lightly loaded "best-effort" network.

As illustrated in FIG. 1, traffic capacity on a particular link is shared among Virtual Leased Line (10), Assured (12), and Basic (14) traffic services. Virtual Leased Line (10) traffic obtains the highest priority, but is limited by a traffic rate cap (18). When idle, Virtual Leased Line (10) capacity (16) can be utilized by Assured (12) and Basic (14) packets. One mechanism for optimizing traffic flow supports a prioritized dropping of some of the packets differentiating Assured (12) traffic flow from Basic (14) traffic flow.

The three classes of service operate using a traffic priority scheme configured such that priority is given to Virtual Leased Line (10) traffic such that the service quality to the Assured (12) and Basic (14) classes is impacted. Likewise, the priority scheme for the Assured (12) service class impacts the quality of service to the Basic (14) service class.

Engineering guidelines for the appropriate choices of parameters and bandwidth allocation for each of the three classes for each link in the network are:

1. the maximum bandwidth reserved for the Virtual Leased Line class;
2. the weight assignments employed in a Weighted Fair Queuing (WFQ) packet scheduling mechanism (alternative schemes could employ variations of weighted round-robin schemes such as Modified Deficit Round Robin "M-DRR" as an approximation of WFQ when the number of queues is small);
3. the global and local thresholds for buffer management; and
4. parameters for configuring a Weighted Random Early Discard (WRED) mechanism for each of the three classes.

Virtual Leased Line service (10) guarantees a unidirectional reserved rate $R_f$ for a point-to-point flow. When packets arrive at an ingress point in the network at a rate exceeding $R_f$, they are dropped prior to entering the network. The reserved rate supported by the Virtual Leased Line service (10) may be renegotiated or may vary over time. Virtual Leased Line service (10) is similar to leased line service, but a leased line service guarantees a fixed delay, while the delay in Virtual Leased Line service (10) is variable but typically very low. While leased line service is also realized by reserving a physical circuit from the origin to destination, the Virtual Leased Line service (10) is typically realized on an Internet Protocol network that statistically multiplexes its resources among several services across a virtual circuit. Finally, the time-scale at which the transmission rate can be changed is smaller for a Virtual Leased Line (10) service than a leased line service.

The essence of the point-to-point restriction for Virtual Leased Line (10) bandwidth can be guaranteed between a pair of ingress and egress routers by reserving appropriate bandwidth on all routers along the path of transmission. This eliminates the difficulties associated with providing a high quality service across many possible (non-deterministic) paths, particularly when the egress points can vary. Under congestion conditions, each link along the path is designed to have a sufficient bandwidth to carry the Virtual Leased Line traffic with no packet loss due to the provisioning features of the Virtual Leased Line service (10).

Figure 2:
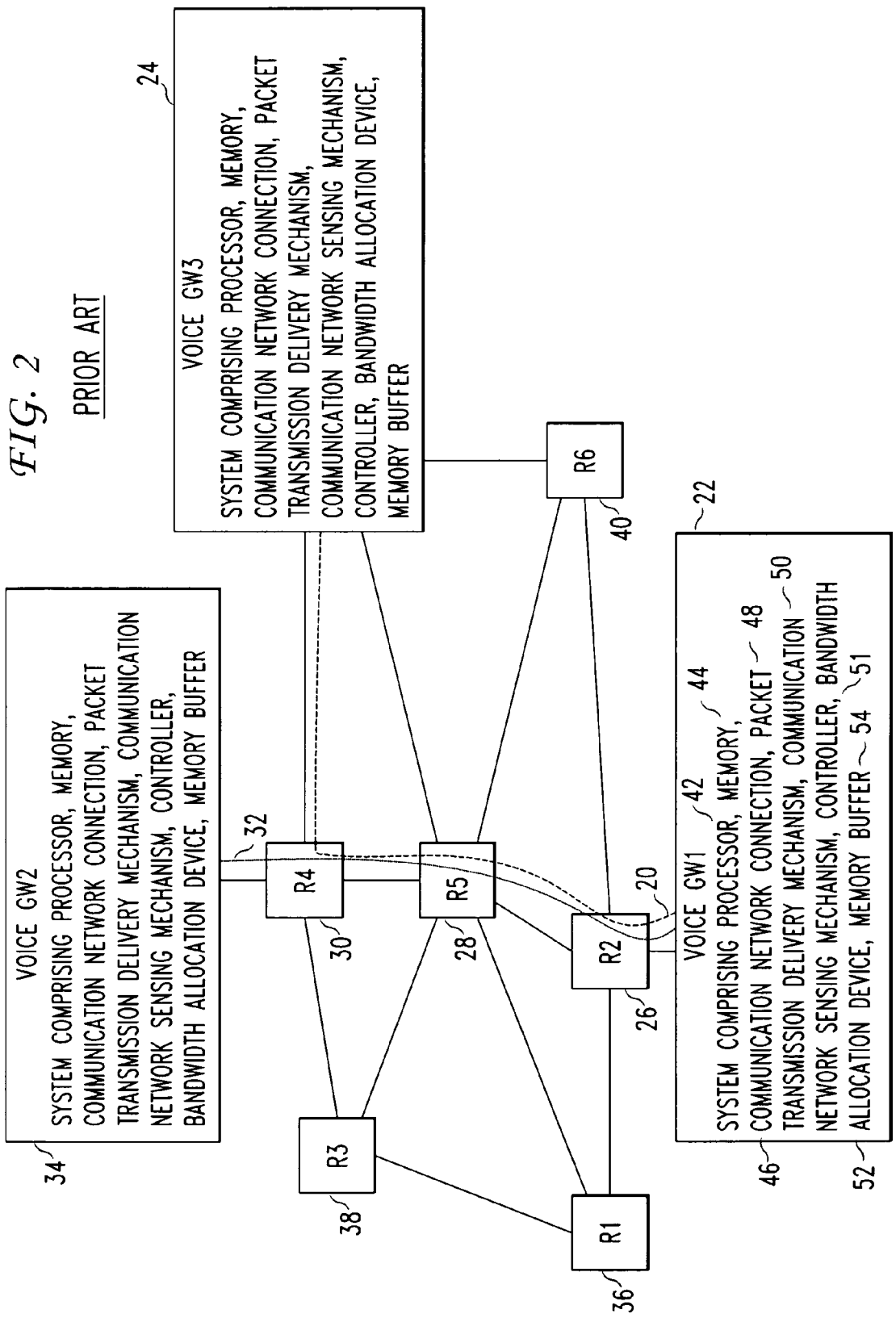
FIG. 2 illustrates the routing scheme of a typical path for data or voice over a series of routers.

FIG. 2 illustrates the routing scheme of a typical path for data or voice over a series of nodes. In FIG. 2, the path of a first Virtual Leased Line (20) across voice gateways 1 (22) and 3 (24) traverses nodes R2 (26), R5 (28) and R4 (30), respectively. Typically, R2 (26), R5 (28) and R4 (30) are routers but other communication devices can also be utilized to receive and transmit packets along the communication network. Similarly, the path of a second Virtual Leased Line (32), across voice gateways 1 (22) and 2 (34) traverses the same routed path except the path between nodes R4 (30) and voice gateway 2 (34). Thus, the bandwidth requests of the first (20) and second (32) Virtual Leased Lines are reserved individually on the nodes R2 (26)-R5 (28) and R5 (28)-R4 (30) links, and the nodes R2 (26)-R5 (28), and R5 (28)-R4 (30), respectively. In this illustration, the nodes R2 (26)-R5 (28), and R5 (28)-R4 (30) are routers.

Each of the nodes or routers along the path for the first (20) and the second (32) Virtual Leased Lines must reserve a sufficient bandwidth for the packet traffic resources for both the Virtual Leased Lines (20) and (32) operating at peak performance. Additional nodes or routers R1 (36), R3 (38) and R6 (40) can be connected to the other nodes or routers on the network handling the first Virtual Leased Line (20) and the second Virtual Leased Line (32). Allocation of the bandwidth along secondary routes also needs to be calculated to support Virtual Leased Line services along the primary pathways.

The voice gateways 1 (22), 2 (34) and 3 (24) comprise systems that are typically computers, routers or information appliances that typically include a microprocessor (42), memory system (44), and a communication interface or connection (46) that allows the system and voice gateway to be connected to the communication network. Other components comprising the system are a packet transmission delivery device (48), a communication network sensing mechanism (50), a controller (51), a bandwidth allocation device (52), and a memory buffer (54). The communication interface or connection (46) may be a modem or other data packet transmission and receiving device. The communication sensing mechanism (50) is capable of sensing the topology of the communication network including the network's router parameters and characteristics. The controller (51) is capable of scheduling the transmission of the packets across the communication network. The bandwidth allocation device (52) is capable of allocating and reserving sufficient bandwidth according to a preselected scheme corresponding to service classifications. The memory buffer (54) allows the system to buffer certain service classification packets to maximize the probability of packet delivery for higher classes of packet delivery services. The components described above do not necessarily have to be located within the same system or computer but can be coupled or connected together to form the system.

If the Virtual Leased Line (32) fails at node R5 (28), then the architecture will redirect packet traffic along alternative routes. When the Virtual Leased Line (32) is established, a calculation is made along alternative pathways such as the data pathway on nodes R2 (26)-R1 (36)-R3 (38)-R4 (30).

When node R5 (28) fails, the architecture automatically redirects the packet traffic along the alternative pathway because the architecture has reserved Virtual Leased Line bandwidth along the alternative pathways.

If and when traffic congestion conditions occur, the links between nodes R4 (30)-R5 (28) and R5 (28)-R2 (26) must be able to serve all Virtual Leased Line service links in the route. Thus, the summation of all the reserved rates or guaranteed bandwidth for Virtual Leased Lines on a particular link must be less than the total bandwidth allocation for Virtual Leased Line class on that link. Guarantees for no packet loss for Virtual Leased Line service can be made only if the aggregate rate reserved for all the Virtual Leased Lines services on any link is less than the total capacity available on that link. The bandwidth share that can safely be dedicated to Virtual Leased Line service without adverse impact on Assured and Basic classes requires setting some predetermined criteria and parameters.

Various levels of service availability can be provided on links based on the time scale corresponding to recover time from a link or router failure. Given enhanced forwarding and routing capabilities typical of most routers, such as those available in Multi-Protocol Layered Switching (MPLS), recovery times can be reduced to the millisecond range. If the Virtual Leased Line service guarantees are to be maintained during a router failure, then Virtual Leased Line capacity planning and admission control has to account for the alternative paths that must be reserved for different failure scenarios. However, accounting for these alternative paths may limit the total amount of Virtual Leased Line traffic admitted along the various links.

Figure 3:
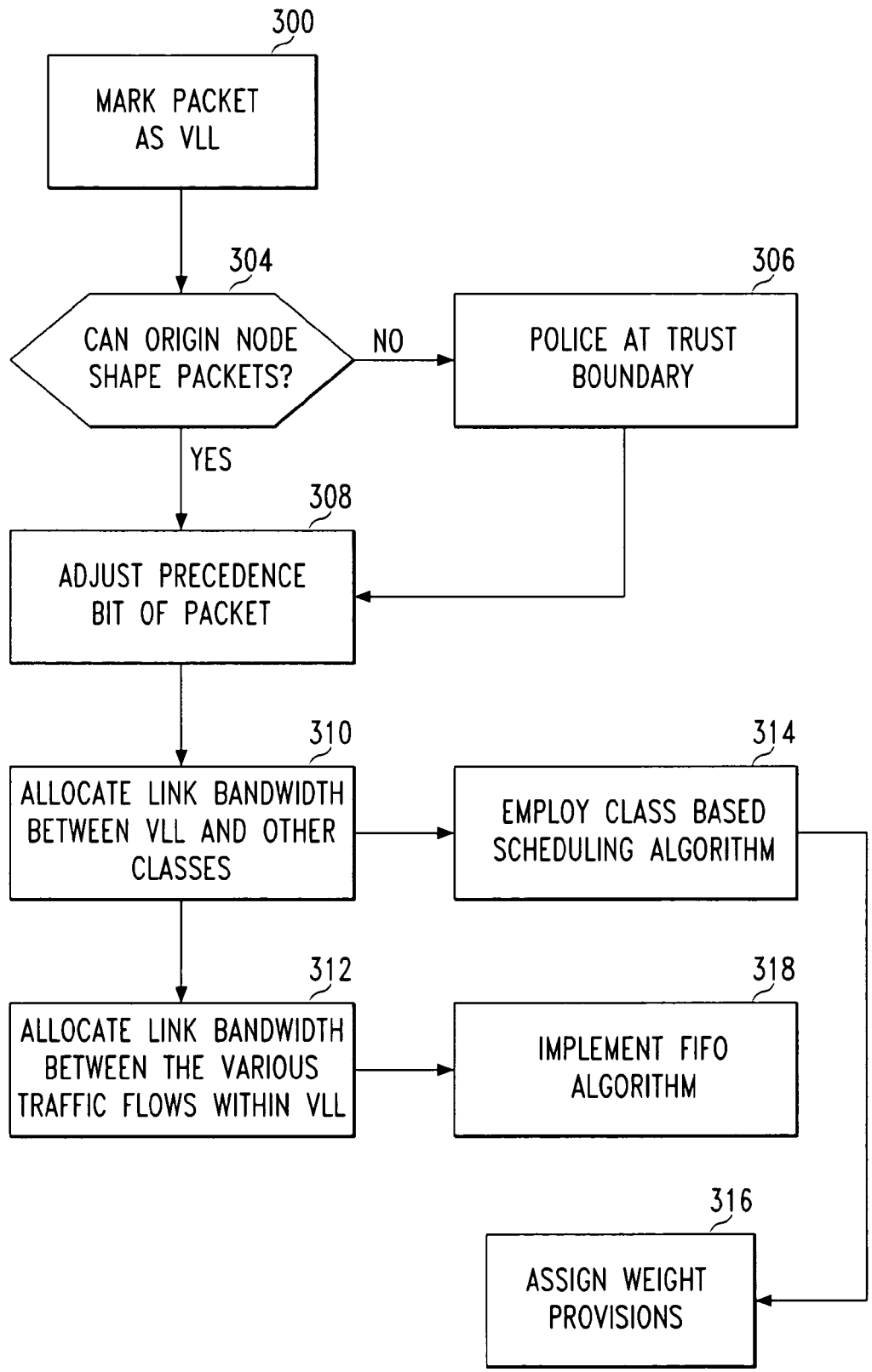
FIG. 3 illustrates the Virtual Leased Line origin shaping the traffic for the Virtual Leased Line service.

FIG. 3 illustrates the Virtual Leased Line origin shaping the traffic for the Virtual Leased Line service. The packets are marked according to the Virtual Leased Line service class (300). If the origin node cannot be trusted to shape the packets appropriately (304), then the policing is carried out at the trust boundary (306). This is accomplished by implementing the appropriate setting of the Internet Protocol precedence bits of the packet (308). In particular, using the router's policing mechanism, the ingress router can drop packets arriving at a rate exceeding the reserved rate.

The router identifies the packets belonging to the Virtual Leased Line service class-based on the Diffserv Codepoints (DSCP) in the packet's header. The expedited packet handling behavior denotes the Virtual Leased Line service class. To access the Virtual Leased Line service, the router makes the following two scheduling decisions:

1. Allocation of link bandwidth (310) between the Virtual Leased Line and other service classes.
2. Allocation of link bandwidth (312) between the various traffic flows within the Virtual Leased Line class.

The allocation of link bandwidth (310) between the Virtual Leased Line and other service classes provides extremely low delay and jitter to the Virtual Leased Line service class; the router is programmed to prioritize the scheduling. The router may employ a class-based scheduling algorithm (314) that allocates bandwidth among various service classes in a weighted fair manner (316), such as by WFQ or M-DRR. In this embodiment, the router may have to emulate priority behavior by assigning a sufficiently large weight to the Virtual Leased Line class. This weight provision may be required to be significantly larger than what is typically necessary to allocate the desired bandwidth to the appropriate class. For example, if 20% bandwidth is allocated to Virtual Leased Line, a network administrator may have to assign a weight that allocates 50% bandwidth.

For allocation of link bandwidth (312) between the various flows within the Virtual Leased Line class, the router could employ a single first-in, first-out (FIFO) relationship scheme (318) for these traffic flows. There may be an advantage to using separate FIFOs if the Virtual Leased Line is used to aggregate smaller bursty flows; but for relatively smooth applications, such as Voice-over-IP (VoIP) applications, a single FIFO is typically sufficient.

Virtual Leased Line service typically guarantees a near-zero packet loss due to congestion. This guarantee can typically only be made if the aggregate rate reserved for all the Virtual Leased Lines on any link is less than the capacity available on that link for the Virtual Leased Line service. To ensure that this condition is met, a Bandwidth Broker network management tool can be used. As Multi-Protocol Layered Switching (MPLS) mechanisms become available, they also can be used to provide enhanced control of the Virtual Leased Line path and to provide ultra-fast restoration capabilities in response to router failures. RSVP, as a signaling protocol for aggregate QoS flows, can also improve the flexibility of QoS subscriptions by changing the signaling protocol from a current static subscription to a dynamic subscription in both time-scale and rate renegotiations.

A Bandwidth Broker tool can be used to help achieve the setting of these parameters for routers located along the data pathway between the ingress and egress points of the network. For example, when a customer wants to subscribe to a Virtual Leased Line path from point A to point B, the Bandwidth Broker tool can apply an inter-domain routing protocol such as Open Shortest Path First (OSPF) to find the exact series of links the Virtual Leased Line path will traverse. The Bandwidth Broker tool also determines if each of these links has a sufficient bandwidth to support the Virtual Leased Line subscription. If there is a sufficient bandwidth, the subscription is accepted; otherwise, the required Virtual Leased Line rate cannot be honored.

Figure 4:
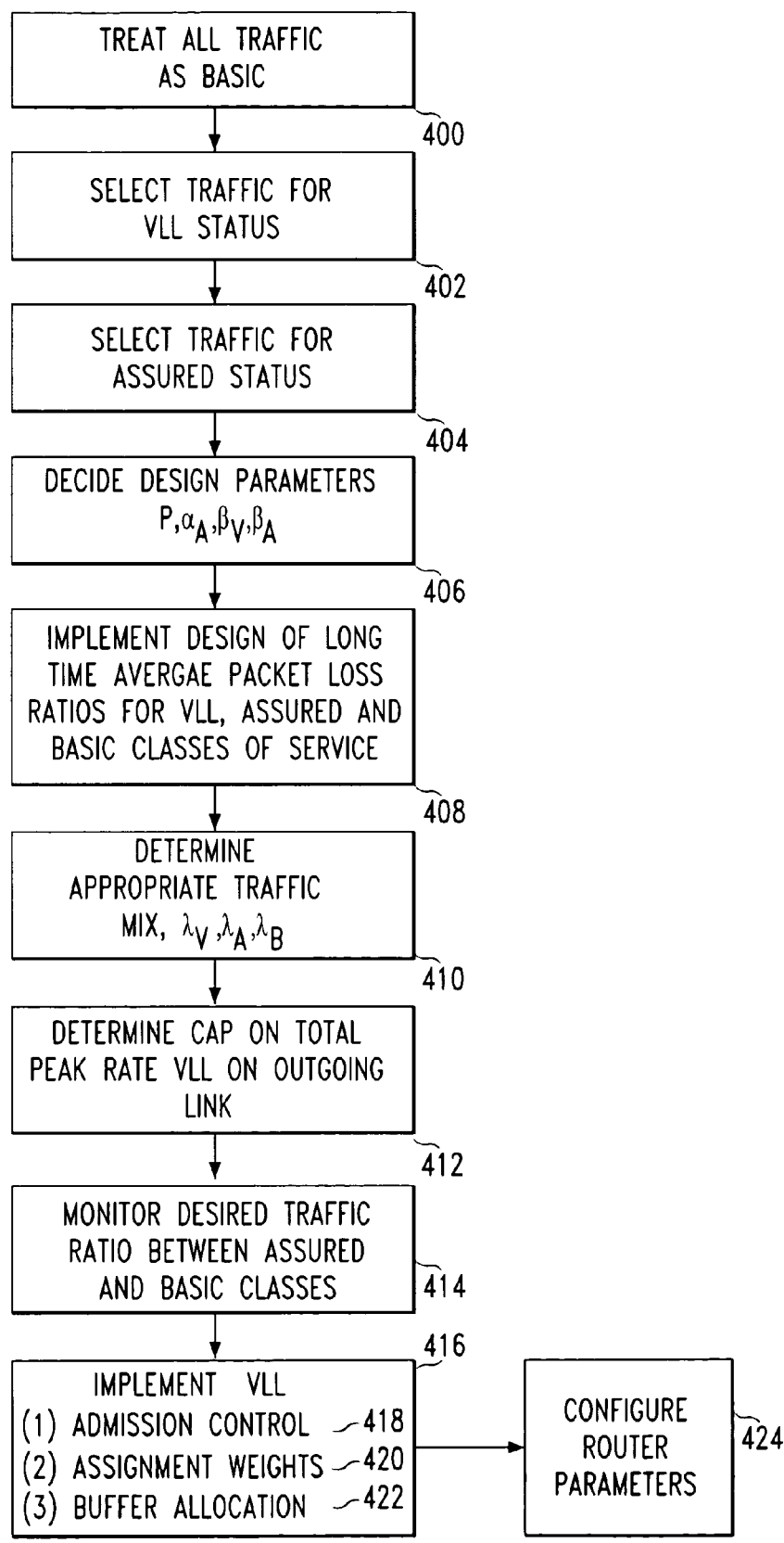
FIG. 4 illustrates a flow chart describing the configuration of the router parameters.

FIG. 4 illustrates a flow chart describing the configuration of the router parameters. Router parameters are determined based on the three classes of services between a particular link. First, packets are treated as the Basic traffic (400). Part of overall traffic flow is classified as Virtual Leased Line traffic (402) while the remaining traffic continues to be treated as Basic traffic. From the remaining Basic traffic, additional packets are selected and classified as Assured traffic (404). The following design criteria (406) for the router parameters is set to achieve:

1. Virtual Leased Line traffic packet loss approaching zero and minimization of delay and jitter.

$$P_V \approx p$$

2. QoS received by the Assured traffic flows are noticeably better than the Basic traffic flows during periods of congestion.

$$\frac{P_A}{P_B} \leq \alpha_A$$

The criteria in this equation are that the relative packet loss ratio of the Assured service versus the Basic service can be translated into the relative throughput ratio for transmission control protocol (TCP) connections.

3. Virtual Leased Line traffic is designed such that the QoS of service for the Assured and Basic traffic flows does not experience significant deterioration.

$$\frac{P_{all-V} - P_{all}}{P_{all}} \leq \beta_V$$

4. The Assured traffic does not significantly deteriorate the QoS of the Basic traffic.

$$\frac{P_B - P_{all-V}}{P_{all-V}} \leq \beta_A$$

The time average packet loss ratio is used at each outgoing link as a measure of QoS of the three classes. If $P_V$, $P_A$, and $P_B$ denote the long time average packet loss ratios (408) of the Virtual Leased Line, Assured, and Basic traffic, then $P_{all}$ denotes the long time average packet loss ratio of all traffic. If $P_{all-V}$ denotes the long time average packet loss ratio of the combined Assured and Basic traffic, then both classes are treated as lesser quality of services and the Virtual Leased Line service receives premium status.

In order to find the appropriate traffic mix (410), each out-going link is analyzed to satisfy the design principles of the subscriptions: If $\lambda_{all}$ is denoted as the total aggregate traffic rate for the link under analysis, then $\lambda_V$, $\lambda_A$, and $\lambda_B$ are denoted as the traffic rates of the Virtual Leased Line Assured, and Basic, respectively. Consequently, $\lambda_{all} = \lambda_V + \lambda_A + \lambda_B$.

If the total packet loss ratio remains the same when the traffic is divided into three classes or if WFQ and WRED only redistribute the total packet loss among the three classes, then the closed-loop impact from the TCP connections is ignored.

Traffic engineering considerations for Assured services provide the desired traffic ratio (414) between the Assured and Basic services. Enforcement of such a ratio is difficult for all links for given values of $\beta_A$ and $\alpha_A$. The optimal solution is to monitor this traffic ratio (414) for all links and only take action when the total utilization of the link is greater than 80% and the Assured and Basic traffic ratio (414) is more than the desired value obtain from the equation above. If this scenario occurs, application of Multi-Protocol Layered Switching (MPLS), explicit routing technology or obtaining an additional bandwidth for the link are possible solutions.

The primary QoS requirements (416) for the Virtual Leased Line having zero packet loss during congestion, low queuing delay and jitter can be realized through implementation of: (1) admission control (418) of the total peak Virtual Leased Line traffic to any interface, (2) appropriate assignment of weights (420) in WFQ, and (3) appropriate buffer allocation (422). Admission Control 418 provides the maximum fraction of a link's bandwidth for subscription to Virtual Leased Line service. This fraction should be no more than $w_V=0.5$. The Bandwidth Broker tool can be utilized to track the Bandwidths of the various links. CAR is used at ingress routers to drop any Virtual Leased Line packets above the subscribed rate of the customer.

Weights (420) for Virtual Leased Line service WFQ are ideally 100% for the minimize cross-class jitter for Virtual Leased Line. However, assigning a value of 100% may cause starving for the remaining traffic when the bulk of the Virtual Leased Line packets arrive at the queue in short time intervals or when admission control on Virtual Leased Line traffic fails in some ingress points of the network, causing non-Virtual Leased Line traffic to be marked as Virtual Leased Line Traffic. One compromise is to set the weight for Virtual Leased Line to 50% ($w_V$=50%). In this way, on average, a Virtual Leased Line packet at the head of its queue only needs to wait at most for one Assured or Basic packet to be transmitted while a guarantee of 50% of the remaining bandwidth is available for the rest of the traffic. The value of $w_V$ can be adjusted to higher values on some AR links where the majority of the traffic is for Virtual Leased Line service.

The minimum buffer size (422) for controlling packet loss on the Virtual Leased Line is derived from the minimum buffer space that is available for the Virtual Leased Line traffic. Determining the minimum buffer size (422) typically ignores the intermediate hops that the Virtual Leased Line traffic traverse before reaching the considered out-going link interfaces. Since almost all Virtual Leased Line traffic comes from different customer routers, independence among Virtual Leased Line traffic is assumed. In addition, a Virtual Leased Line subscription is upper-bounded by its peak rates and the sum of all the peak rates has to be less than 50% of the link capacity. The router parameters are then configured (424) for the transmission of the traffic on the network.

In a conservative analysis, this system can be described as N independent Virtual Leased Lines always running at their peak rates where N is the total number of Virtual Leased Lines. The queuing scheme that is used is typically denoted as N*D/D/1. A more conservative, M/D/1 model can also be used to replace the N*D/D/1 model. This simplifies the computations while the queue length estimated is normally greater than the one using N*D/D/1 modeling. In particular, if the asymptotic result of M/D/1 modeling is applied:

$$Pr\{\text{packets in the queue} > k\} \approx e^{-2(1-\rho)k}$$

If $B_V$ is the minimum buffer size (422) to be determined and p is the maximum packet loss probability of the Virtual Leased Line, then $B_V$ can be calculated by:

$$B_V = -\frac{\ln p}{2(1-\rho)}$$

In computing the minimum buffer threshold $B_V$, the value for the annual rate divided by the service rate P and the probability of a dropped packet p can yield a minimum buffer size of 69 packets, assuming an arrival rate divided by the service rate of $\rho$=0.9, and a probability of a dropped packet of $p=10^{-6}$.

An estimate of the maximum delay at a router for an outgoing link of an Optical Carrier Level 3 (OC3) link, when the packet size is 1500 bytes, is a maximum of 0.155 ms to transmit one packet when 50% of the OC3 bandwidth is reserved for Virtual Leased Line traffic. Based on the computation above, there is less than $10^{-6}$ probability that a Virtual Leased Line packet will be subject to 10.6 ms delay at an OC3 interface link. If the VoIP packet size is reduced in size to 120 bytes, the 10.6 ms delay is further reduced to 0.85 ms for the transmission of an Ethernet packet. Since a speech frame size satisfying the G.711 standard is 80 bytes, VoIP encapsulation comprises 40 bytes (20 bytes for the Internet Protocol header, 8 bytes for the User Datagram Protocol (UDP) header, and 12 bytes for Real Time Protocol (RTP)). For a Digital Signal, Level 3 (DS3) interface, the maximum delay for a VoIP packet is increased to 2.56 ms because the DS3 interface transmits at one third of the bandwidth of an OC3 connection.

The buffer management scheme shares buffer space by allocating and separating the packets according to the classes of service. A global threshold is determined for all queues and a series of local thresholds are determined for each queue. For the three classes of services, Virtual Leased Line, Assured and Basic, only two buffers are required: one for the Virtual Leased Line traffic and one for the Assured traffic. Additional buffers would be used if additional service classes were implemented.

Figure 5:
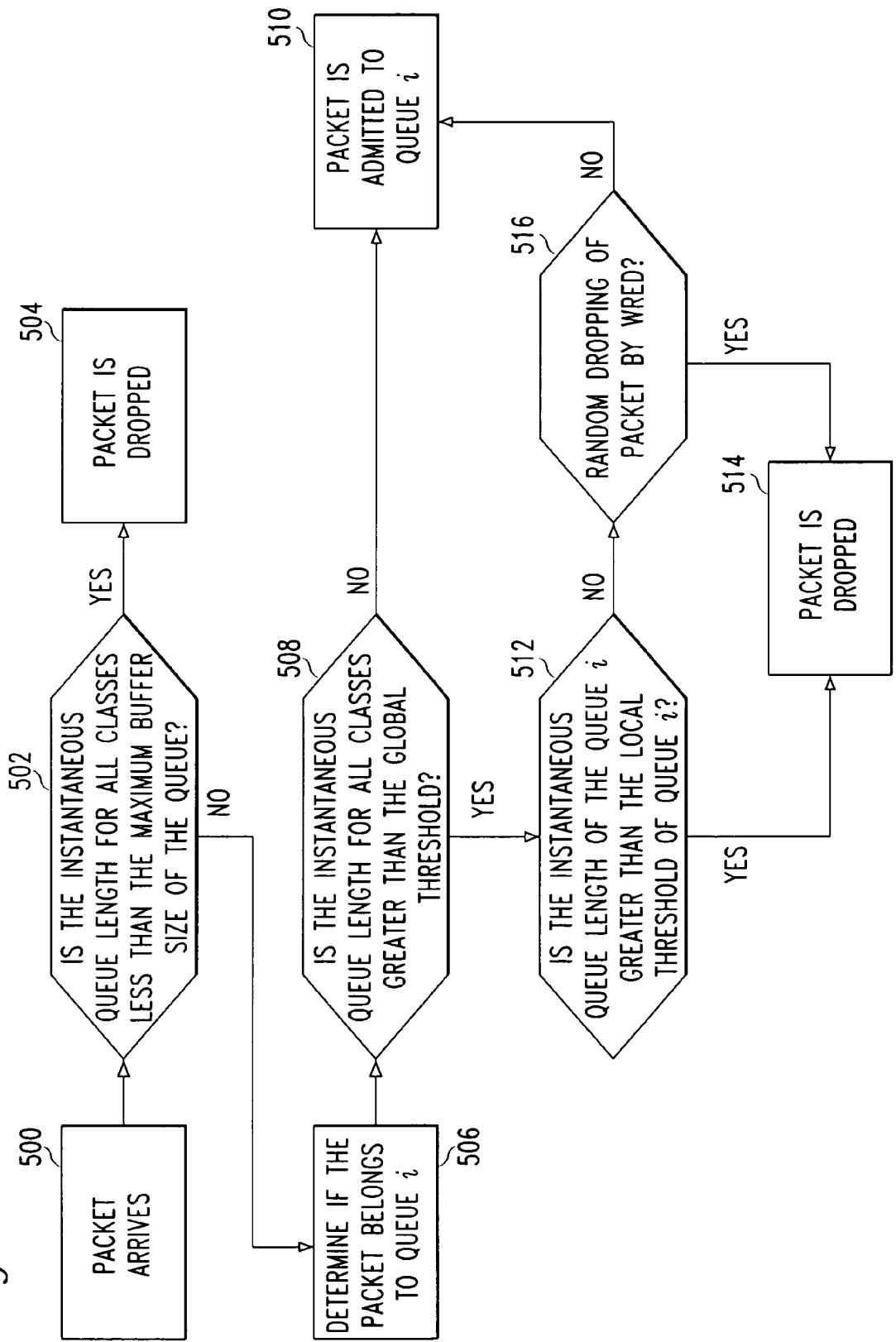
FIG. 5 illustrates a flow chart describing the buffering scheme for Virtual Leased Line, Assured and Basic traffic.

FIG. 5 illustrates a flow chart describing the buffering scheme for Virtual Leased Line, Assured and Basic traffic. When a packet arrives (500), a determination is made to ascertain (502) whether the instantaneous queue length for all the classes is less than the maximum buffer size of the queue. If the determination is affirmative, the packet is dropped (504). If not, the buffering scheme determines if the packet belongs to a particular queue i (506). Next, the buffering scheme determines whether the instantaneous queue length for all classes is greater than the global threshold (508). If the global threshold is not exceeded, the packet is admitted to the queue i (510). When the total number of packets does not exceed the global threshold, the two queues can buffer more packets than the limitations implemented by the local thresholds. If the global threshold is exceeded, then the buffering scheme determines if the instantaneous queue length of the queue i is greater than the local threshold for queue i (512). If the local threshold is exceeded, then the packet is dropped (514). Otherwise, the buffering scheme determines whether the packet can be randomly dropped using WRED (516). The packet is dropped (514) if the analysis using WRED is met. Otherwise, the packet is admitted to queue i (510). However, packets that are already in the queue are not discarded, even if the queue exceeds the individual limit for that class of service.

Setting the global and the two local thresholds requires ensuring that the minimum buffer size required for Virtual Leased Line traffic is met by the following equation:

$$B_V = -\frac{\ln p}{2(1-\rho)}$$

The primary function of the buffer is to absorb the bursts of packet traffic and therefore increase the utilization of the transmission router. If G denotes the global threshold, LV denotes the local thresholds for the Virtual Leased Line traffic, and $L_{A+B}$ for the Assured and Basic traffic combined, then:

$$L_V + L_{A+B} \geq B$$

where B is the maximum buffer size. The maximum buffer size is typically determined based on the desired maximum delay for any given link rate. Otherwise, some buffer space $B-(L_V+L_{A+B})$ may be wasted when the combined queue has reached the global threshold and the local thresholds.

The local threshold is designed to ensure the designated traffic has a certain degree of guarantee of access to the buffer. The local threshold implies that $L_V+L_{A+B} \leq B$; otherwise, when the sum of Assured and Basic packets reach $L_{A+B}$, the Virtual Leased Line packets may not have full access to the local buffer space $L_V$. The global threshold is designed to support buffer sharing so that utilization of the transmission router can be optimized. Therefore, from a utilization perspective, the larger values of G support increased utilization. However, when only two queues exist, a primary concern is guaranteeing the minimum buffer size $B_V$ for the Virtual Leased Line traffic. Therefore:

$$G = B - B_V$$

Based on the desired maximum delay for Virtual Leased Line class for a given link rate, we can obtain an upper bound on the maximum buffer size for the Virtual Leased Line queue, denoted as $V_{max}$. Therefore:

$$L_V = \min\{G, V_{max}\}, \text{ and } L_{A+B} = B - L_V$$

Since $c_V \leq w_V$, the number of the Virtual Leased Line packets in the queue is usually less than G. This provides that the Virtual Leased Line packets are almost guaranteed a minimum buffer space $B_V$ and guarantees the Virtual Leased Line packet loss probability to be at most p. This also allows the majority of the buffer space to be used for the Assured and Basic packets.

The setting of Random Early Detection (RED) as a congestion avoidance mechanism to improve TCP throughput and fairness while reducing average packet loss allows the current average queue size to be congested by:

$$\text{avg} = (1 - 2^{-n}) * \text{previous\_avg\_q\_size} + 2^{-n} * \text{current\_q\_size}$$

The dropping probability on the incoming packet is determined based on three related parameters: (1) the minimum threshold $\min_{th}$ value, (2) the maximum threshold $\max_{th}$ value, and (3) the probability denominator den. When the average queue depth is above the minimum threshold, RED starts randomly dropping incoming packets. The probability of random packet dropping increases linearly as the average queue size increases until the average queue size reaches the maximum threshold. The inverse of the probability denominator is the fraction of packets dropped when the average queue depth is at the maximum threshold, denoted as $p_{max}$. For example, if the denominator, den, is (512), one out of every (512) packets is dropped when the average queue is at the maximum threshold. When the average queue size is above the maximum threshold, all packets are dropped.

Figure 6:
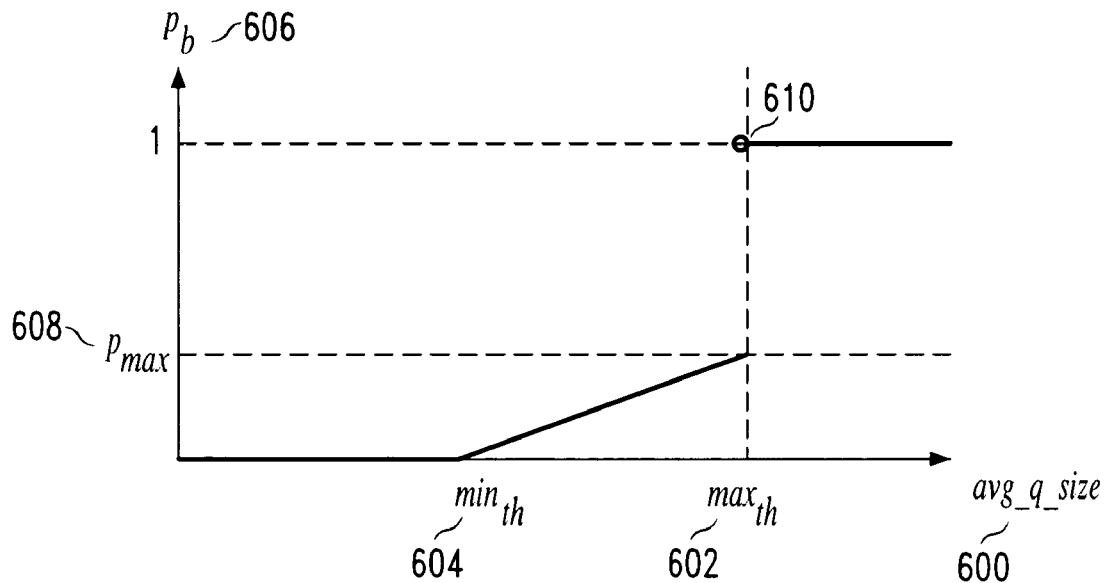
FIG. 6 illustrates a chart describing the packet drop probability for Weighted Random Early Discard (WRED) as a function of average queue size.

FIG. 6 illustrates the packet drop probability for Random Early Detection (RED) as a function of average queue size (600). For a constant average queue size (600), randomly dropping packets at regular intervals can avoid global synchronization. The computed average queue size (600) is always less than or equal to the total buffer size $\max_{th}$ (602). To maximize buffer efficiency, beginning at a predetermined minimum point $\min_{th}$ (604) of the average queue size (600), packets are randomly dropped. As the number of packets in the queue increases beyond the minimum point $\min_{th}$ (604), the number of dropped packets increases until the maximum buffer limit $\max_{th}$ (602) is reached. Once the maximum buffer size $\max_{th}$ (602) is reached, probability of dropping packets $p_b$ (606) reaches a maximum point $P_{max}$ (608), and all packets are dropped (610). This rate of dropped packets can be achieved by adjusting the dropping probability according to the number of undiscarded packets that have arrived since the last discarded packet, denoted as count. The final packet dropping probability $p_a$ increases slowly as the count increases:

$$P_a = \frac{P_b}{1 - \text{count} * P_b}.$$

Figure 7:
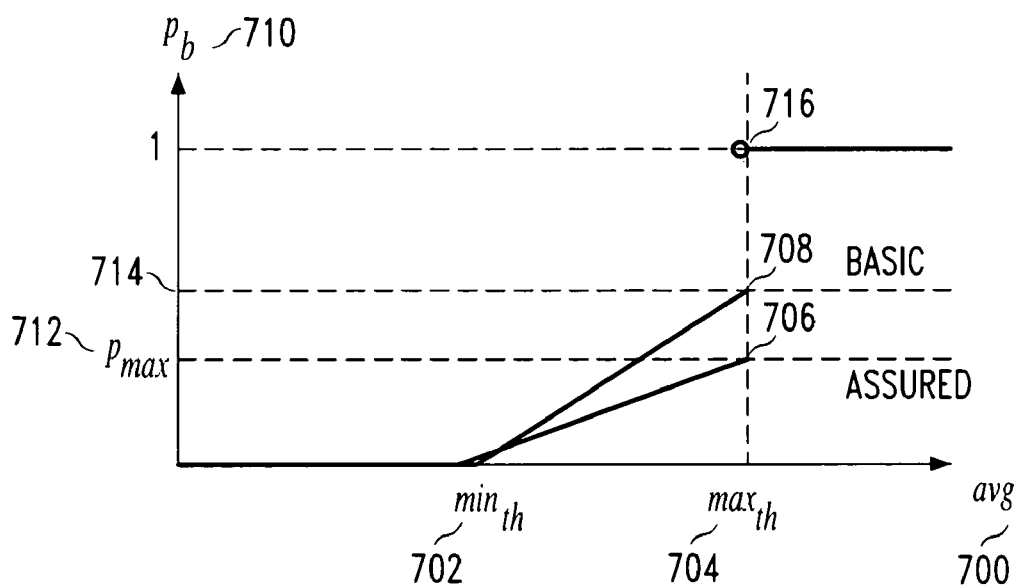
FIG. 7 illustrates when WRED is used to differentiate the QoS for Assured and Basic services, and the probability of dropping Basic packets is more probable than the probability of dropping Assured Packets.

FIG. 7 illustrates when WRED is used to differentiate the QoS for Assured and Basic services, and the probability of dropping Basic packets is more probable than the probability of dropping Assured packets. By setting different RED parameters for each of the two service levels, Assured services can achieve better performance deliveries than Basic service, when the average queue size is computed based on the aggregate queue size (700). The goal is to select a set of $\min_{th}$ (702), $\max_{th}$ (704), and $p_{max}$ (706) and (708) for each of the Assured and Basic service classes. These values are based on values obtained from $P_A/P_B \approx \alpha_A$ where $P_A$ and $P_B$ are packet loss ratios of the Assured and Basic services, respectively.

The computed average queue size (700) is less than or equal to the total buffer size. To maximize buffer efficiency, select the same value for $\max_{th}$ (704) of the Assured service and $\max_{th}$ (704) of the Basic service. Beginning at a predetermined minimum point $\min_{th}$ (702) of the average queue size (700), packets are randomly dropped. As the number of packets in the queue increases beyond the minimum point $\min_{th}$ (702), the number of dropped packets increases until the maximum buffer limit $\max_{th}$ (704) is reached. Once the maximum buffer size $\max_{th}$ (704) is reached, probability of dropping packets $p_b$ (710) reaches a maximum point $p_{max}$ (712) for the Assured service and $p_{max}$ (714) for the Basic service. Beyond the maximum buffer size $\max_{th}$ (704), all packets are dropped (716). The probability of Basic packets being dropped increases faster than the probability of the Assured packets being dropped as the maximum buffer size $\max_{th}$ (704) is approached, thereby ensuring that Basic packets are dropped before Assured packets. This ensures that Assured service achieves higher levels of QoS than Basic service.

When average queue size is between $\min_{th}$ and $\max_{th}$ the dropping probability of the Assured packets is $\alpha_A$ times that of the Basic. If non-random packet drops are rather small, then $P_A/P_B \approx \alpha_A$ where $\alpha_A$ is determined by:

$$\frac{\text{average packet drops of Assured}}{\text{average packet drops of Basic}} \approx \alpha_A$$

Under the proposed parameters set forth above, Assured and Basic packets take the same queue on FIFO basis at each interface. Therefore, along the same forwarding path:

$$TCP \text{ connection throughput} = \frac{\text{constant}}{\sqrt{\text{average packet loss ratio}}}$$

$$\frac{\text{Assured } TCP \text{ throughput}}{\text{Basic } TCP \text{ throughput}} \approx \frac{1}{\sqrt{\alpha_A}}$$

In other words, through controlling packet drop rates of the Assured and Basic classes, control is achieved from the above ratio. The table below gives the values of $\alpha_A$ for desired throughput ratios of the two classes.

| Desired Throughput Ratio of A vs. B | 1.5 | 2 | 2.5 | 3 |
|---|---|---|---|---|
| $\alpha_A$ Needed | 0.444 | 0.250 | 0.160 | 0.111 |

This setting leaves two parameters $min_{th}$ and $p_{max}$ for Basic to be determined. It is recommended to keep $min_{th}$ at the level corresponding to a mean delay of 2 ms for any given link, and p=0.1. The main concept is to minimize non-random packet drops to ensure resulting values for $\alpha_A$.

A computer or server connected to a network of other servers or computers provides the hardware for implementing the Bandwidth Broker aspects of this invention. The computer is connected to the network by a modem or other interface allowing for the transmission and reception of data over a network such as the Internet or an Intranet. One or more microprocessors in the computer receives commands that select data and organize the data for transmission in packets across the network. Additional commands received and executed by the computer's processors or network sensing mechanism allow the computer to sense the topology and routing parameters of the network. Other commands received and executed by the computer's processors or packet transmission delivery mechanism support the classification of the data packets according to a prespecified service class level. In a typical example, the prespecified service class levels would be Virtual Leased Line, Assured and Basic service classes.

Additional sensing performed by the computer supports the selection of a primary and alternate or secondary pathways for transmitting the data packets from a starting point to a destination point. By predetermining the bandwidth allocated to each service class level along the primary or secondary pathways, the computer can ascertain whether a request to transmit data packets across the network along a particular pathway can be processed based on the available bandwidth remaining for the selected service class level. If available bandwidth exists, the data packet can receive a reservation on the pathway with a guarantee of required bandwidth to ensure proper delivery of the data packet. The computer can facilitate the changing of router or other parameters involved in transmitting data packets, i.e., bandwidths for the different levels of service classifications can be modified and changed based on the requirements of the customer.

The Bandwidth Broker's major functionality includes provisioning Virtual Leased Line subscriptions, provisioning Assured subscriptions, and traffic monitoring. The subscriptions granted can be made by static or dynamic decisions. Static Virtual Leased Line service provisioning occurs when a prospective Virtual Leased Line customer submits a purchase request for Virtual Leased Line service. A determination is made whether the request can be categorized into one or multiple point-to-point, unidirectional Virtual Leased Lines. For each Virtual Leased Line, the customer should provide the Internet Protocol addresses of the two end points and the peak rate of the Virtual Leased Line service to be subscribed. The Bandwidth Broker determines if the request can be accepted or denied based on the available bandwidth along each link in the required path.

The steps for making this decision are as follows:

1. Determine the traversing path the prospective customer's point-to-point, Virtual Leased Line will take.
2. Check the remaining bandwidth allocated to Virtual Leased Line service for each link along the traversing path.
3. Compare the peak Virtual Leased Line rate required by the prospective customer with the remaining bandwidth allocated for the Virtual Leased Line service for each link of the traversing path. However, caution is needed for load balancing. In the cases where there are multiple, say k, equal cost links, the peak rate used for each equal cost link should be adjusted by a factor (a/k) where "a" takes a value between 1 and "k" and is typically pre-specified. If there is any link along the path whose remaining Virtual Leased Line bandwidth is smaller than the required peak rate after adjustment, the request of the prospective customer is denied. Otherwise, the Bandwidth Broker proceeds to step.
4. If QoS of Virtual Leased Line needs to be guaranteed during any single failure condition, for each single failure of the backbone, determine (1) the alternative path as in step 1; (2) the remaining bandwidth for Virtual Leased Line along the path as in step 2; and (3) whether the bandwidth allocated to Virtual Leased Line can accommodate the peak rate required by the prospective customer as in step 3. If there is any single failure that would make any link along the alternative path deficient of the required bandwidth in order to accommodate the new service request, the request is denied. Otherwise, the request is accepted. The information maintained by the Bandwidth Broker is then updated in a database as provided in the next step.
5. Subtract the peak rate of the new request from the remaining bandwidth allocated to Virtual Leased Line on each link along both its primary traversing path (under no failure condition) and alternative paths (under each single failure condition). Admit the prospective customer to the Virtual Leased Line customer database.

To carry out the tasks described above, the Bandwidth Broker should maintain the updated information on the network topology, the Open Shortest Path First (OSPF) metric assigned to all links, line speeds of all links, the maximum bandwidth that can be subscribed to the Virtual Leased Line service for each link, all Virtual Leased Line routes and rates currently subscribed to customers, and the bandwidth already subscribed to Virtual Leased Line service of each link under the normal condition.

Figure 8:
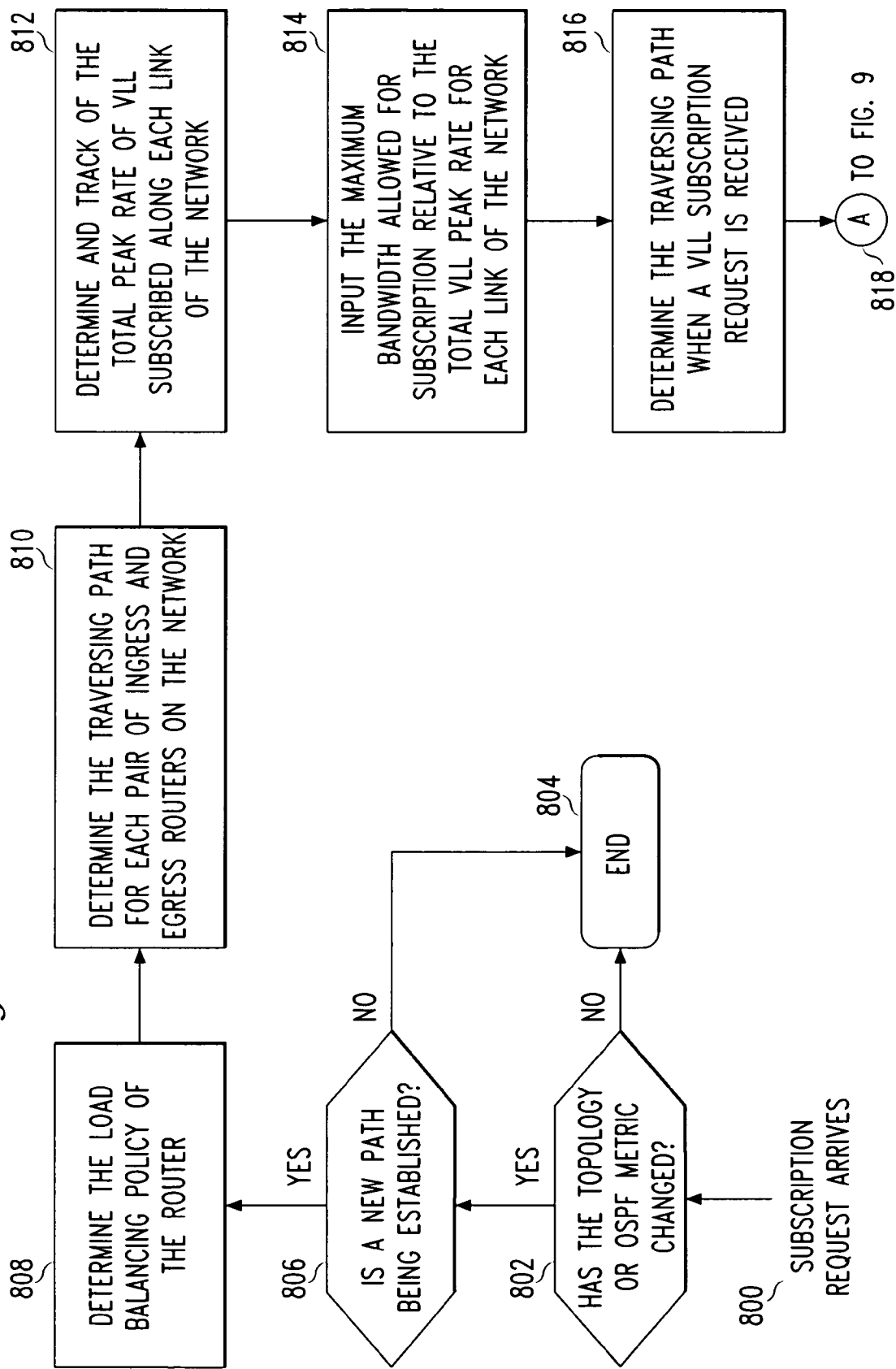
FIG. 8 illustrates a flow chart describing the Assured service setting of the rate of traffic flow and warning flags.

FIG. 8 illustrates a flow chart describing the Virtual Leased Line service setting of the rate of traffic flow and warning flags. When a packet arrives (800) at an ingress router, the Bandwidth Broker determines (802) whether the topology or OSPF metric has changed. If a change has not occurred, the analysis ends (804). If a change has occurred, the Bandwidth Broker determines if a new path is being established (806). If a new path is not being established, the analysis ends (804). Otherwise, the Bandwidth Broker determines the load balancing policy of the router (808). Next, the Bandwidth Broker determines (810) the traversing paths for each pair of ingress and egress routers on the network.

Figure 9:
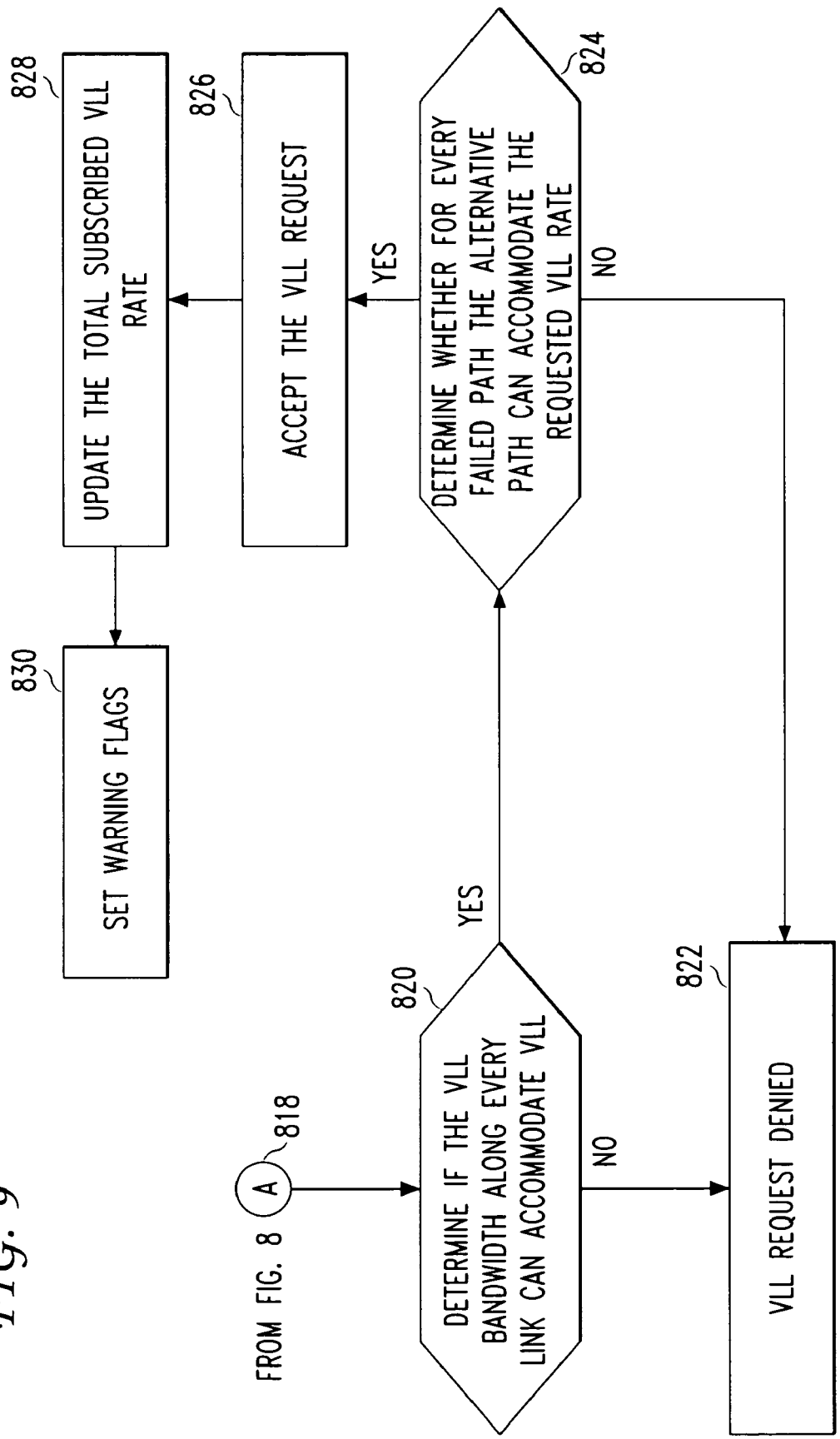
FIG. 9 illustrates a flow chart describing the Assured service setting of the rate of traffic flow and warning flags.

Then the Bandwidth Broker determines and tracks the total peak rate of the Virtual Leased Line subscribed along each link of the network (812). The maximum bandwidths are input for subscription relative to the total Virtual Leased Line peak rate for each link in the network (814). Then the Bandwidth Broker determines the traversing path when a Virtual Leased Line subscription request is received at the ingress router (816). Connection A (818) links FIG. 8 and FIG. 9.

The Bandwidth Broker then determines whether the Virtual Leased Line traffic along every link can accommodate the Virtual Leased Line service (820). If the Virtual Leased Line service cannot be accommodated, then the Virtual Leased Line request is denied (822). If the request is granted, the Bandwidth Broker determines whether for every failed path, an alternative path can be established to accommodate the requested Virtual Leased line rate (824). If the Virtual Leased Line service can not be accommodated, then the Virtual Leased Line request is denied (822). If the request is granted, the Bandwidth Broker accepts the Virtual Leased Line request (826), updates the total subscribed Virtual Leased Line rates (828), and sets the warning flags (830).

Routing protocols such as OSPF always select the shortest path for packet forwarding. The OSPF cost metric assigned to all links is independent of real-time traffic through the links and the shortest path will remain unchanged as long as the network topology and metric assigned to all links remain unchanged.

Figure 10:
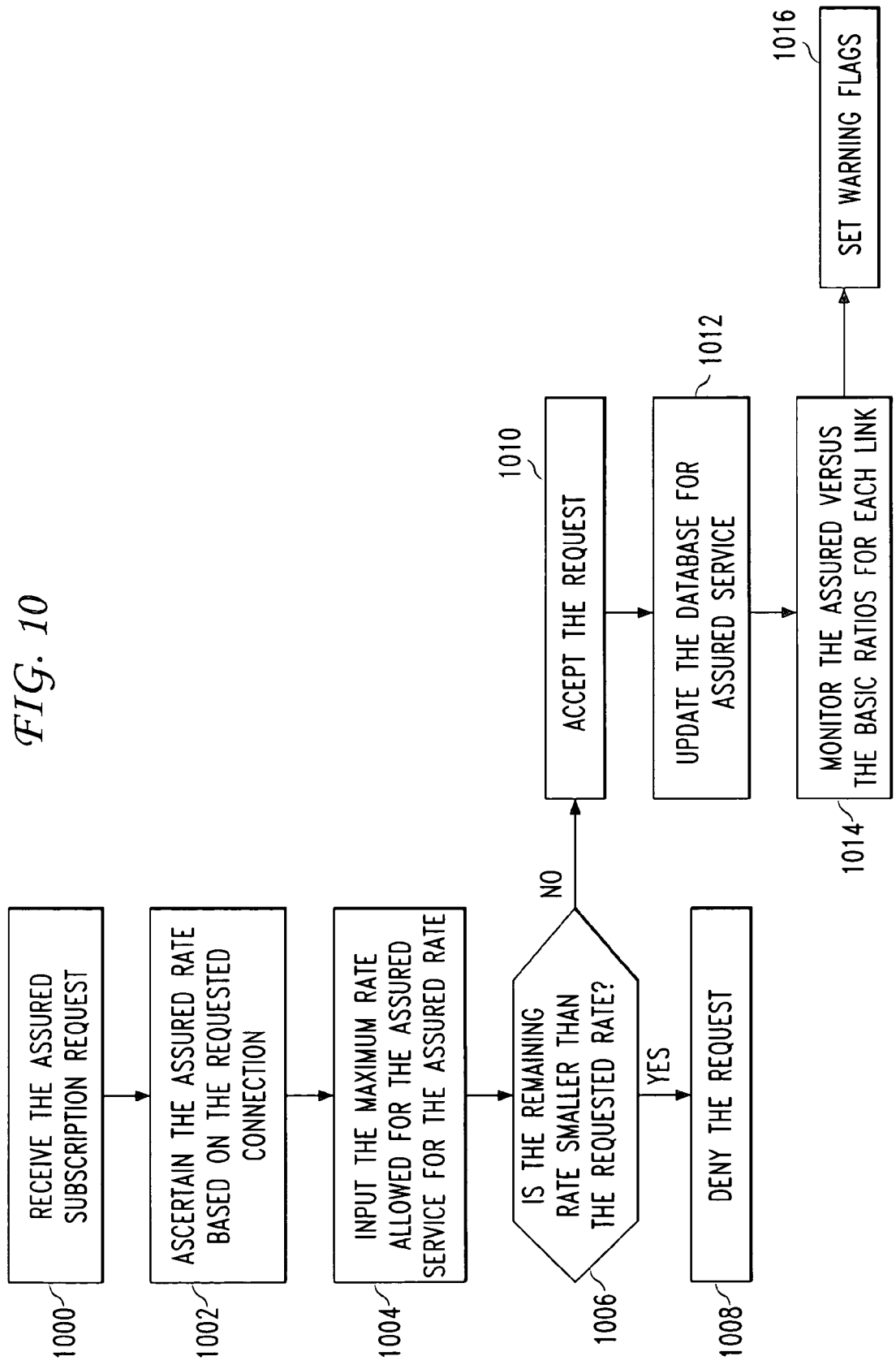
FIG. 10 illustrates a flow chart describing the Assured service setting of the rate of traffic flow and warning flags.

FIG. 10 illustrates a flow chart describing the Assured service setting of the rate of traffic flow and warning flags. For static Assured service provisioning, when a prospective Assured customer submits a purchase request for Assured service, the rate is also specified. The Bandwidth Broker determines if the request can be accepted or denied. This decision is based on the total Assured traffic that should be admitted into the backbone.

To make such a decision, upon receiving the Assured service subscription request (1000), the Bandwidth Broker determines the Assured rate requested by the prospective customer (1002). The Bandwidth Broker also determines the maximum total rate that can be allowed for the Assured service at the requested Assured rate (1004). The remaining rate for the Assured service is then calculated for other Assured rates.

The Bandwidth Broker compares the requested Assured rate with the remaining Assured service rate availability (1006). The rate request is denied if the remaining rate is smaller than the required rate (1008), otherwise the Assured rate request is accepted (1010). If the Assured rate request is accepted (1010), the remaining available Assured rates are updated in the router databases (1012) as well as the customer data. The Bandwidth Broker continues to monitor the traffic ratio of Assured service versus the Basic service for each link (1014). By performing this monitoring, warning flags (1016) are set for those links with ratios above a pre-specified threshold. This requires that the Bandwidth Broker monitor the network traffic for Assured and Basic service classes for a pre-specified time interval. In addition, the Bandwidth Broker should monitor the remaining Virtual Leased Line bandwidth on each link. Warning flags are also set for those links to alert the network when the Virtual Leased Line bandwidth exceeds a pre-specified threshold.

For dynamic provisioning, subscriptions can be realized by using RSVP for aggregate flows, where customers can request and resize their reservations dynamically. Once aggregating RSVP reservations are standards are finalized, the Bandwidth Broker can be extended to support a dynamic subscription. The Bandwidth Broker serves as a part of the provisioning and monitoring tool for differentiated classes of services. Also, the Bandwidth Broker can be integrated with a policy server where QoS policies are enforced and can become a part of the Policy Decision Point (PDP) where decisions are made according to the policies. The decisions are realized at the Policy Enforcement Points (PEPs), i.e., the associated network devices (router, gateway, firewall, etc.).

While exemplary systems and methods embodying the present invention are shown by way of example, it will be understood, of course, that the invention is not limited to these embodiments. Modifications may be made by those skilled in the art, particularly in light of this disclosure. For example, each of the elements of the disclosed embodiments may be utilized alone or in combination with elements of the other embodiments.

What is claimed is:

1. A method for use in a network that carries packet traffic under at least two classes of service, the method comprising determining individually for each of a plurality of links in the network whether a predetermined parameter associated with said each link meets a predetermined criterion, said parameter being a function of the amount of packet traffic over said each link that is entitled to one of the classes of service and being further a function of the amount of packet traffic over said each link that is entitled to the other of the classes of service, wherein said parameter is the ratio of a) the amount of packet traffic over said each link that is entitled said one of the classes of service to b) the amount of packet traffic over said each link that is entitled to the other of the classes of service and wherein said criterion is that said ratio exceeds a predetermined threshold.

* * * * *